(12) United States Patent
Yarbrough

(10) Patent No.: US 8,257,048 B2
(45) Date of Patent: Sep. 4, 2012

(54) WIND TURBINE BLADE MULTI-COMPONENT SHEAR WEB WITH INTERMEDIATE CONNECTION ASSEMBLY

(75) Inventor: Aaron Yarbrough, Clemson, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/185,705

(22) Filed: Jul. 19, 2011

(65) Prior Publication Data

US 2012/0027614 A1 Feb. 2, 2012

(51) Int. Cl.
*F03D 1/06* (2006.01)
*F04D 29/38* (2006.01)

(52) U.S. Cl. ............... 416/226; 416/233; 244/123.8

(58) Field of Classification Search ............ 416/224, 416/226, 232, 233, 229 R, 230, 241 A; 244/123.1, 244/123.2, 123.7, 123.8, 123.13, 123.5, 123.6
See application file for complete search history.

(56) References Cited

U.S. PATENT DOCUMENTS

| | | | |
|---|---|---|---|
| 2,503,450 A * | 4/1950 | Nebesar .................. 244/123.7 |
| 3,771,748 A * | 11/1973 | Jones .................. 244/123.13 |
| 4,643,646 A * | 2/1987 | Hahn et al. .................. 416/226 |
| 5,476,704 A * | 12/1995 | Kohler .................. 428/119 |
| 6,234,423 B1 * | 5/2001 | Hirahara et al. .......... 244/123.7 |
| 6,513,757 B1 | 2/2003 | Amaoka et al. |
| 6,520,706 B1 | 2/2003 | McKague et al. |
| 6,800,956 B2 | 10/2004 | Bartlett |
| 6,964,723 B2 | 11/2005 | Lindsay et al. |
| 7,037,568 B1 | 5/2006 | Rogers et al. |
| 7,179,059 B2 * | 2/2007 | Sorensen et al. ............ 416/226 |
| 7,244,487 B2 | 7/2007 | Brantley et al. |
| 7,258,828 B2 | 8/2007 | Fish |
| 7,371,304 B2 | 5/2008 | Christman et al. |
| 7,393,488 B2 | 7/2008 | Grose et al. |
| 7,625,623 B2 | 12/2009 | Grose et al. |
| 7,810,757 B2 | 10/2010 | Kirkwood et al. |
| 7,841,835 B2 | 11/2010 | Bagepalli et al. |
| 7,897,095 B2 | 3/2011 | Raeckers |
| 8,075,275 B2 * | 12/2011 | Althoff et al. ............... 416/226 |
| 2003/0037867 A1 | 2/2003 | Bersuch et al. |
| 2006/0225278 A1 | 10/2006 | Lin et al. |
| 2007/0036659 A1 | 2/2007 | Hibbard |
| 2007/0110584 A1 | 5/2007 | Stommel |
| 2009/0087318 A1* | 4/2009 | Althoff et al. ............... 416/226 |
| 2010/0135815 A1 | 6/2010 | Bagepalli et al. |
| 2010/0135817 A1* | 6/2010 | Wirt et al. .................... 416/226 |
| 2010/0143143 A1 | 6/2010 | Judge |
| 2010/0162567 A1 | 7/2010 | Kirkwood et al. |

(Continued)

FOREIGN PATENT DOCUMENTS

WO WO 2009/155920 A1 12/2009

*Primary Examiner* — Edward Look
*Assistant Examiner* — Liam McDowell
(74) *Attorney, Agent, or Firm* — Dority & Manning, P.A.

(57) ABSTRACT

A wind turbine blade has upper and lower shell members with a respective spar cap configured on an internal face of the shell members. A shear web extends between the spar caps along a longitudinal length of the blade and includes first and second components extending from a respective spar cap. An intermediate connection assembly is provided between facing transverse ends of the first and second components, and includes bond paste retaining structure configured relative to the transverse ends to achieve a bond between the transverse ends having desired width and thickness dimensions.

7 Claims, 5 Drawing Sheets

U.S. PATENT DOCUMENTS

| | | |
|---|---|---|
| 2011/0008175 A1 | 1/2011 | Gau |
| 2011/0081247 A1* | 4/2011 | Hibbard ........................ 416/226 |
| 2011/0142663 A1* | 6/2011 | Gill ............................... 416/226 |
| 2011/0176928 A1 | 7/2011 | Jensen |
| 2012/0027610 A1 | 2/2012 | Yarbrough |
| 2012/0027612 A1 | 2/2012 | Yarbrough |
| 2012/0027613 A1 | 2/2012 | Yarbrough |
| 2012/0027615 A1 | 2/2012 | Irizarry-Rosado et al. |

* cited by examiner

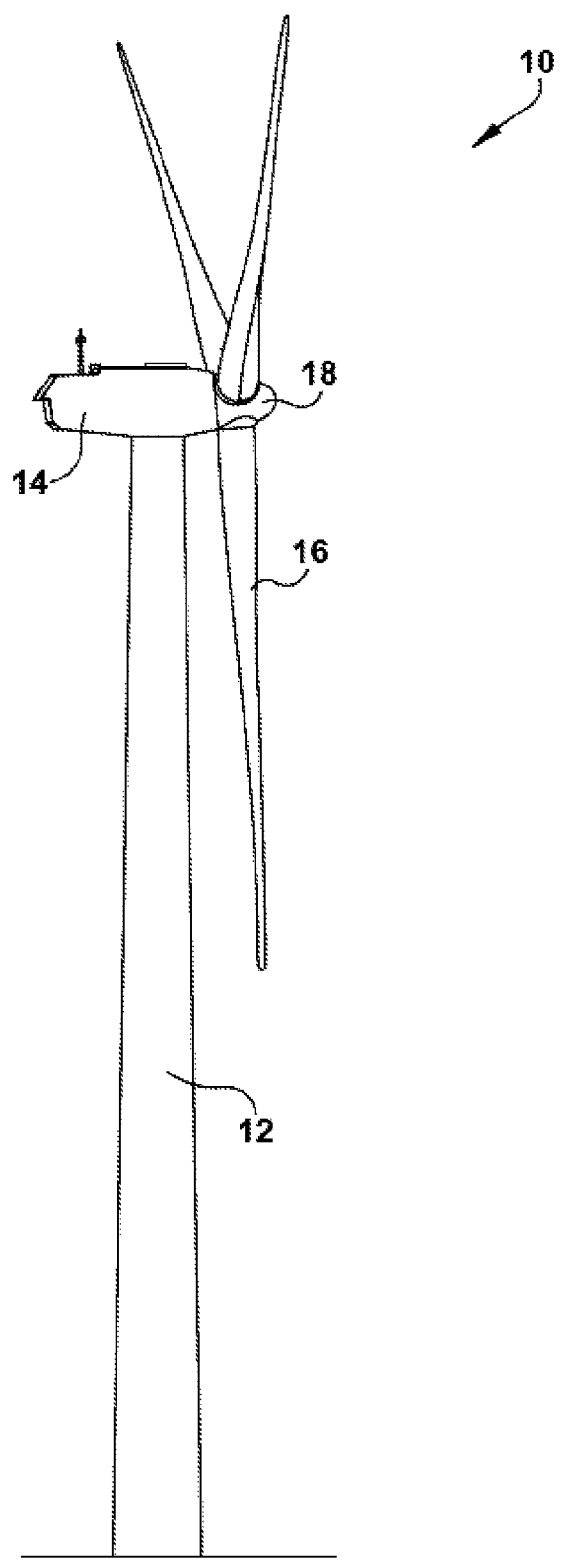
*Fig. -1-*
*Prior Art*

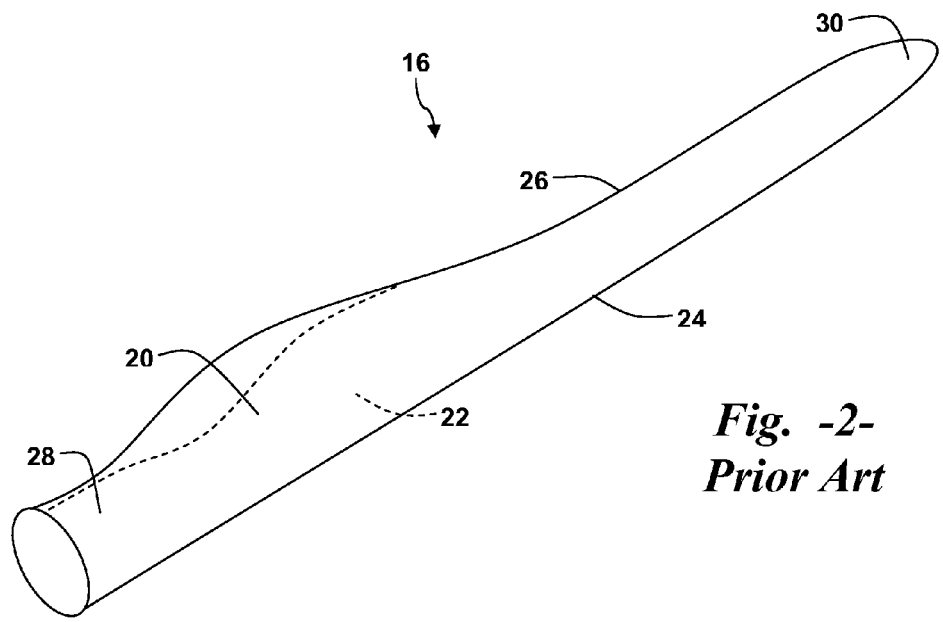
Fig. -2-
Prior Art
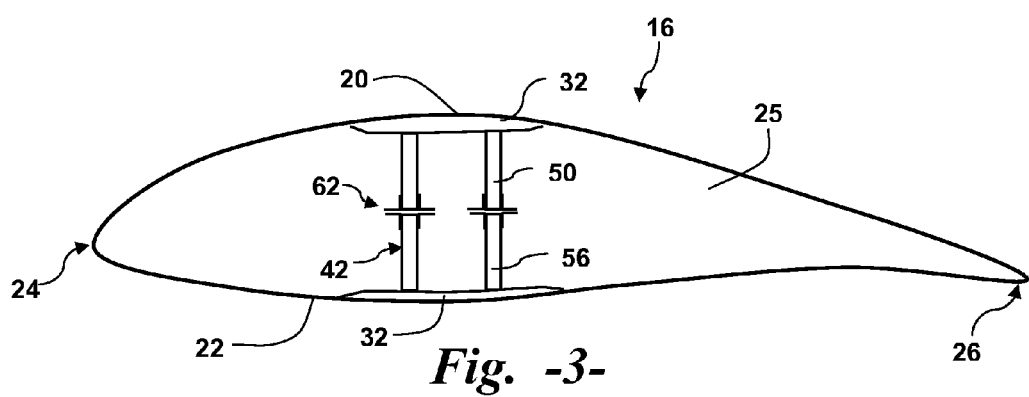
Fig. -3-

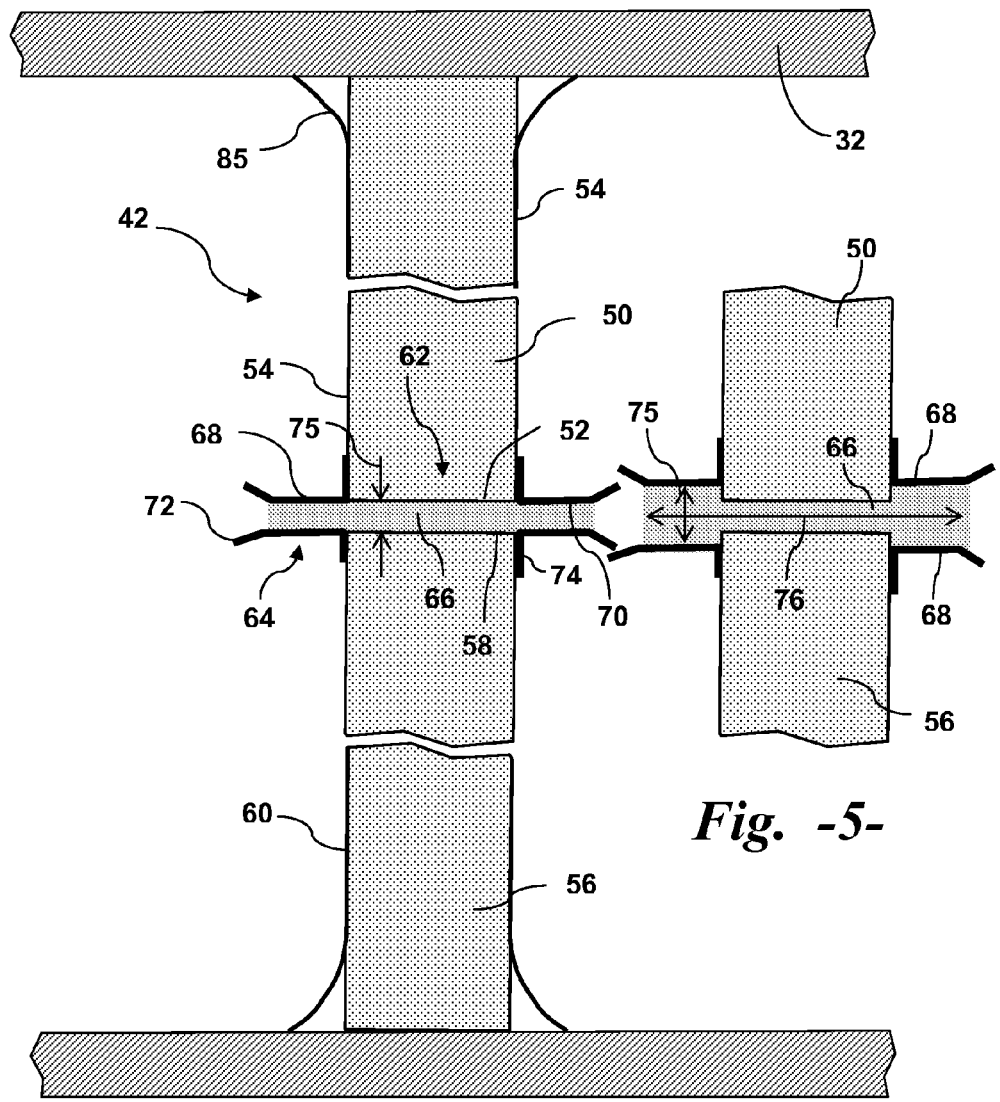
Fig. -4-
Fig. -5-

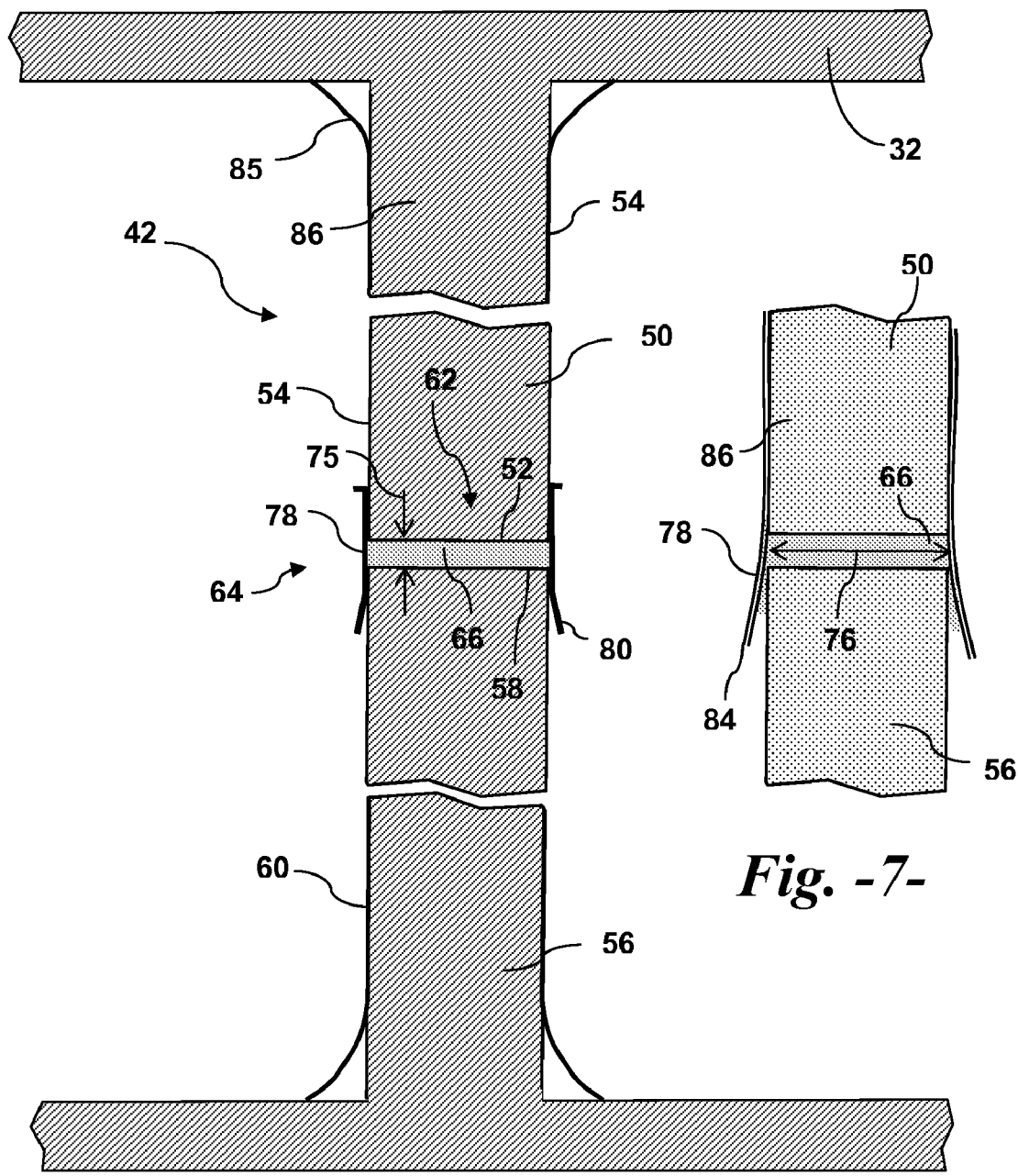
Fig. -6-
Fig. -7-

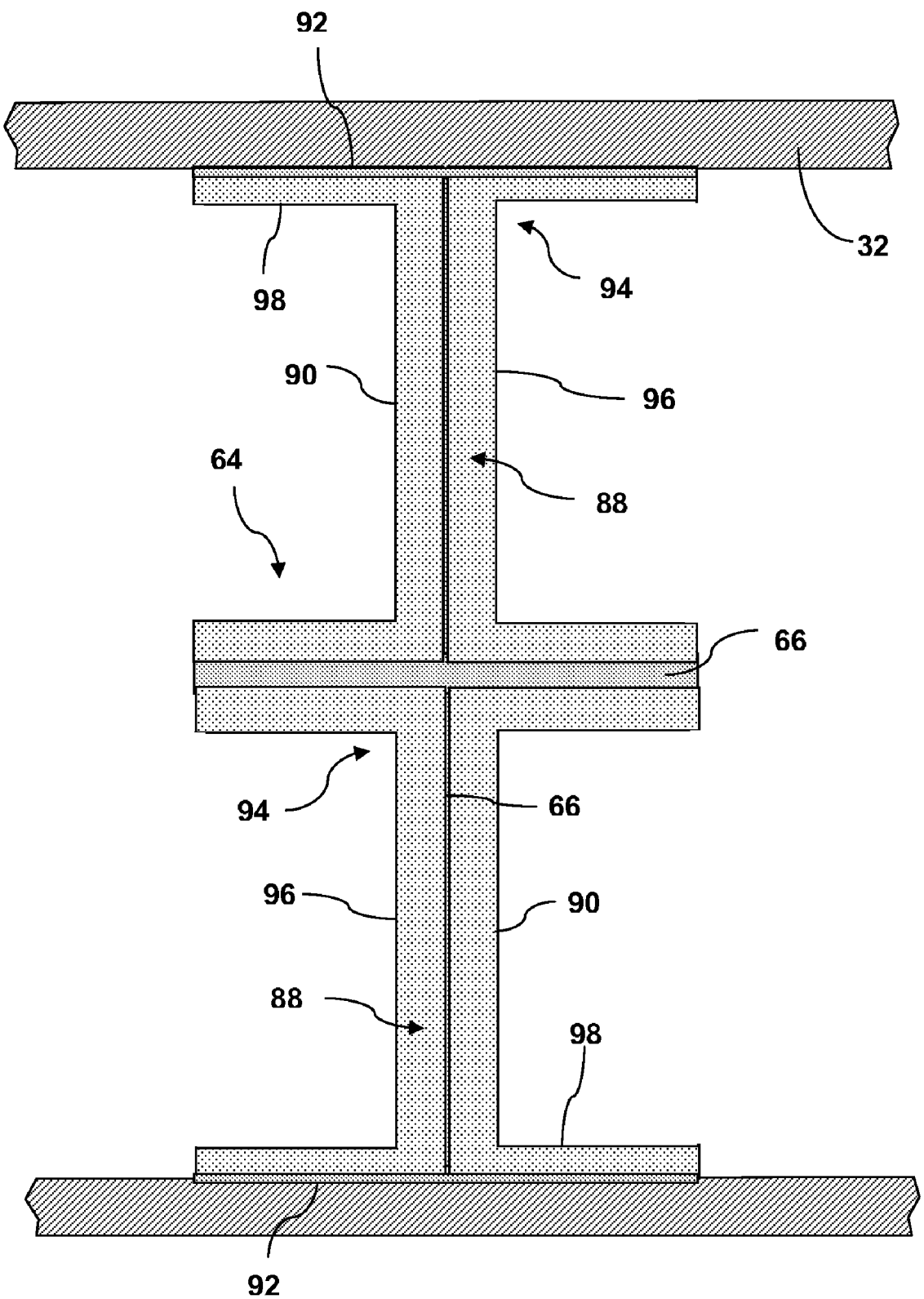
Fig. -8-

WIND TURBINE BLADE MULTI-COMPONENT SHEAR WEB WITH INTERMEDIATE CONNECTION ASSEMBLY

FIELD OF THE INVENTION

The present invention relates generally to the field of wind turbines, and more particularly to the shear web configuration within the wind turbine blades.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of a suction side shell and a pressure side shell that are bonded together at bond lines along the trailing and leading edges of the blade. An internal shear web extends between the pressure and suction side shell members and is bonded to spar caps affixed to the inner faces of the shell members. Relatively exact length dimensions are required for the spar web to span between the spar caps and achieve a bond between the spar cap and shear web having sufficient width and thickness dimensions. Achieving these dimensions, as well as an adequate bond, can be difficult and the juncture between the spar caps and shear web is a time-consuming and tedious process that often requires significant re-work.

With typical blade constructions, the shear web is a continuous member that spans between the spar caps, and a rigid flange is used to achieve a desired bond width for bond paste applied between the spar caps and transverse ends of the shear web. This configuration, however, places significant stresses on the juncture between the shear web and spar cap and often results in the use of excess bond paste to achieve a desired bond width at this critical juncture. The excess paste contributes unnecessary weight to the blade and can break off and result in blade "rattling" during operation of the wind turbine (a not uncommon complaint from wind turbine owners/operators). Also, air voids and unpredictable squeeze-out of the bond paste in the typical construction can result in areas of decreased bond strength, which is particularly problematic in sections of the blade where repair is not possible from within the blade.

Accordingly, the industry would benefit from an improved bond configuration between the shear web and spar caps that addresses one or more of the deficiencies of certain conventional configurations.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade includes an upper shell member having a spar cap configured on an internal face thereof, and a lower shell member having a spar cap configured on an internal face thereof. A shear web extends between the spar caps along a longitudinal length of the blade. The shear web includes first and second longitudinally aligned components that extend from a respective spar caps. An intermediate connection assembly is configured between facing transverse ends of the first and second components and includes retaining structure configured relative to the transverse ends to achieve a bond between the components at the transverse ends having desired width and thickness dimensions. Bond paste is confined by the retaining structure.

The intermediate connection assembly may be variously configured. In one particular embodiment, the retaining structure includes transversely extending flange members affixed to sides of the first and second components. These flange members define a bond having a width that is significantly greater than the width of the transverse ends of the first and second components. The increased bond width provides a strong bond between the components with a relatively thin bond paste layer between the bond faces of the flanges at the connection assembly. The flange members may be attached such that their respective bond face lies essentially flush with the transverse end of their respective shear web component or, in an alternate embodiment, may be spaced longitudinally from the transverse end so as to define a stepped bond profile.

In still a different embodiment, the retaining structure may be provided by longitudinally extending wall members that bridge between the transverse ends of the first and second components. These wall members may be variously configured. For example, the wall members may be components that are separately formed and attached to the longitudinal sides of either of the shear web components so as to extend past the transverse end of the component and define a receipt channel for the opposite shear web component. The wall members may have a shape so as to engage directly against the longitudinal sides of the shear web components, or may flare outwardly to provide a more complex bond configuration. In a particular embodiment, the wall members may be defined by extensions of the longitudinal side walls (e.g., skin) of one of the first or second components.

In a unique embodiment, the first and second components of the shear web may be integrally formed components of the spar caps instead of separately formed and attached components. For example, the first and second shear web components may comprise a foam core that is infused directly with a respective spar cap. Longitudinal side walls or "skins" of the shear web components may extend transversely out from the foam core and be bonded to the spar cap at a juncture between the component and spar cap.

With yet another unique embodiment, the first and second components of the shear web may be beam members that have a center longitudinal beam and opposite transversely extending end faces, with one end face affixed to the spar cap and the opposite end face defining a portion of the bond paste retaining structure. The beam members may be variously configured. For example, in one embodiment, the beam members may be integral I-beam type structures. In another embodiment, each of the beam members may include pairs of oppositely oriented channel members (e.g., C-shaped channel members) affixed together along respective sides thereof to define the center longitudinal beam.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of a conventional wind turbine blade;

FIG. 3 is a cross-sectional view of an exemplary wind turbine blade incorporating aspects of the invention;

FIG. 4 is an enlarged cross-sectional component view of a multi-component shear web connection assembly in accordance with an embodiment of the invention;

FIG. 5 is an enlarged cross-sectional view of a different embodiment of a multi-component shear web connection assembly;

FIG. 6 is an enlarged cross-sectional component view of an alternate embodiment of a multi-component shear web connection assembly;

FIG. 7 is an enlarged cross-sectional component view of still another embodiment of a multi-component shear web connection assembly; and FIG. 8 is an enlarged cross-sectional component view of yet another embodiment of a multi-component shear web connection assembly.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity 25 (FIG. 3) in which various structural members, such as spar caps and one or more shear webs, are configured.

FIG. 3 is a cross-sectional view of a wind turbine blade 16 that incorporates aspects of the invention. The blade 16 includes one or more internal structural shear webs 42 that span between the upper 20 and lower shell members 22. In particular, the shear webs 42 span between structural spar caps 32 that are fixed to the internal faces of the shell members 20, 22. In accordance with aspects of the invention, the shear web 42 is a multi-component combination with one component 50 affixed to the spar cap 32 on the upper shell member 20 and the other component 56 affixed to the spar cap 32 on the lower shell member 22.

The shear web components 50, 56 may be formed similar to conventional shear webs with a foam core between laminated side walls 54, 60 ("skin"), or as any other suitable structural member. The components 50, 56 are affixed to respective spar caps 32 by any suitable bonding or attachment means. For example, any manner of brace and bond paste configuration 85 may be provided at the interface between the components 50, 56 and the spar cap. In a particular embodiment, the brace 85 may be defined by extensions of the side walls 54, 60 of the components 50, 56 that are bonded to the spar caps 32.

In certain embodiments, the shear web components 50, 56 may be molded or infused integral components of the spar caps 32, as depicted for example in FIG. 6. In this type of embodiment, the components 50, 56 may have a foam core 86 that is infused directly with a respective spar cap 32. The longitudinal side walls 54, 60 may extend transversely out from the foam core 86 and define a brace 85 that is bonded to the spar cap 32 at the juncture between the component 50, 56 and spar cap 32.

Referring to the embodiments of FIGS. 4 and 5, a connection assembly 62 is provided between the aligned transverse ends 52, 58 of the shear web components 50, 56 at an intermediate point along the longitudinal aspect of the shear web 42. This connection assembly 62 may be variously configured, as explained in greater detail below, and includes retaining structure 64 configured relative to the transverse ends 52, 58 to retain a quantity of bond paste 66 that achieves a bond having a design width 76 and thickness 75 between the transverse ends 52, 58.

In FIG. 4, the connection assembly 62 and retaining structure 64 includes transversely extending flange members 68 having legs 74 that are attached or otherwise configured on the sides 54, 60 of the first and second shear web components 50, 56. The flange members 68 have transverse legs with flared ends 72 and a bond face 70. Bond paste 66 is applied between the opposed bond faces 70 and between the opposed transverse ends 52, 58 of the shear web components. Thus, a bond is formed having a width 76 that is significantly greater than the width of the opposed transverse ends 52, 58 alone.

In FIG. 4, the bond face 70 of the flange members 68 lies essentially flush with the transverse ends 52, 58 of the first and second shear web components 50, 56 such that the bond paste 66 has a generally uniform thickness 75 along the width dimension 76. In the embodiment of FIG. 5, the flange members 68 are offset from the transverse ends 52, 58 such that the bond paste 66 has a greater thickness 75 between the opposed bond faces 70 as compared to between the opposed transverse ends 52, 58. This stepped bond paste profile may provide enhanced bonding strength in certain embodiments.

In the embodiments of FIGS. 6 and 7, the retaining structure 64 includes longitudinally extending wall members 78 that bridge between the transverse ends 52, 58 of the first and second shear web components 50, 56. The wall members 78 may be affixed to either of the components 50, 56 and define an opening 80 that forms a channel for receipt of the opposite one of the components 50, 56. In one embodiment, the wall members 78 may be components that are separately formed and attached to longitudinal sides 54, 60 of the respective components 50, 56, as in FIG. 6. In an alternate embodiment, the wall members 78 may be defined by extensions 84 of longitudinal side walls 54, 60 of the respective first or second component 50, 56.

FIG. 8 depicts an embodiment wherein the first and second components 50, 56 of the shear web 42 comprise respective beam members 88 having a center longitudinal beam 90 and opposite transversely extending end faces 92. One of the end faces 92 is bonded or otherwise affixed to a respective spar cap 32 and the opposite end face 92 defines the retaining structure 64 at the connection assembly 62. The beam members 88 may be variously configured. For example, each beam member may be a single, integrally formed member, such as an I-beam structure. In the embodiment of FIG. 8, the beam members 88 are formed by pairs of channel members 94 (e.g., a U-shaped channel member) that are bonded or otherwise affixed together in a back-to-back configuration along a center longitudinal beam portion 96. Each of the channel members 94 includes an end portion 98 that is a component of the retaining structure 64 and contributes to the increased bond width at the connection assembly 62.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade, said shear web further comprising first and second components extending from respective said spar caps;
   an intermediate connection assembly between facing transverse ends of first and second components of said shear web, said intermediate connection assembly further comprising:
      retaining structure configured relative to said transverse ends to achieve a bond between said transverse ends having desired width and thickness dimensions; and,
      bond paste confined by said retaining structure; and
      said retaining structure comprising a pair of transversely extending flange members affixed to opposite sides of each of said first and second components, wherein opposed said flange members define bond faces that provide a transverse bond having a width greater than a width of said transverse ends of said first and second components.

2. The wind turbine blade of claim 1, wherein said bond faces of said flange members lie flush with said transverse end of said respective first or second component.

3. The wind turbine blade of claim 1, wherein said first and second components of said shear web are integrally formed components of said spar caps.

4. The wind turbine blade of claim 3, wherein said first and second components of said shear web comprise a foam core that is infused directly with a respective said spar cap.

5. The wind turbine blade of claim 4, wherein said first and second components of said shear web comprise longitudinal side walls that extend transversely out from said foam core and are bonded to said spar cap at a juncture between said first or second component and said spar cap.

6. The wind turbine blade of claim 1, wherein said bond faces of said flange members are offset from said transverse end of said respective first or second component such that the bond between said opposed bond faces has a greater thickness as compared to the bond between said transverse ends of said first and second components.

7. A wind turbine blade, comprising:
   an upper shell member having a spar cap configured on an internal face thereof;
   a lower shell member having a spar cap configured on an internal face thereof;
   a shear web extending between said spar caps along a longitudinal length of said blade, said shear web further comprising first and second components extending from respective said spar caps;
   an intermediate connection assembly between facing transverse ends of first and second components of said shear web, said intermediate connection assembly further comprising:
      retaining structure configured relative to said transverse ends to achieve a bond between said transverse ends having desired width and thickness dimensions;
      bond paste confined by said retaining structure; and
      said retaining structure comprising longitudinally extending walls members that bridge between said transverse ends of said first and second components, said wall members defined by extensions of longitudinal side walls of a respective one of said first or second components.

* * * * *